Dec. 14, 1926.  1,610,615
W. SCHÄFFER
ARRANGEMENT FOR MAINTAINING ANODE VOLTAGE CONSTANT IN TUBE TRANSMITTERS
Filed Oct. 28, 1924
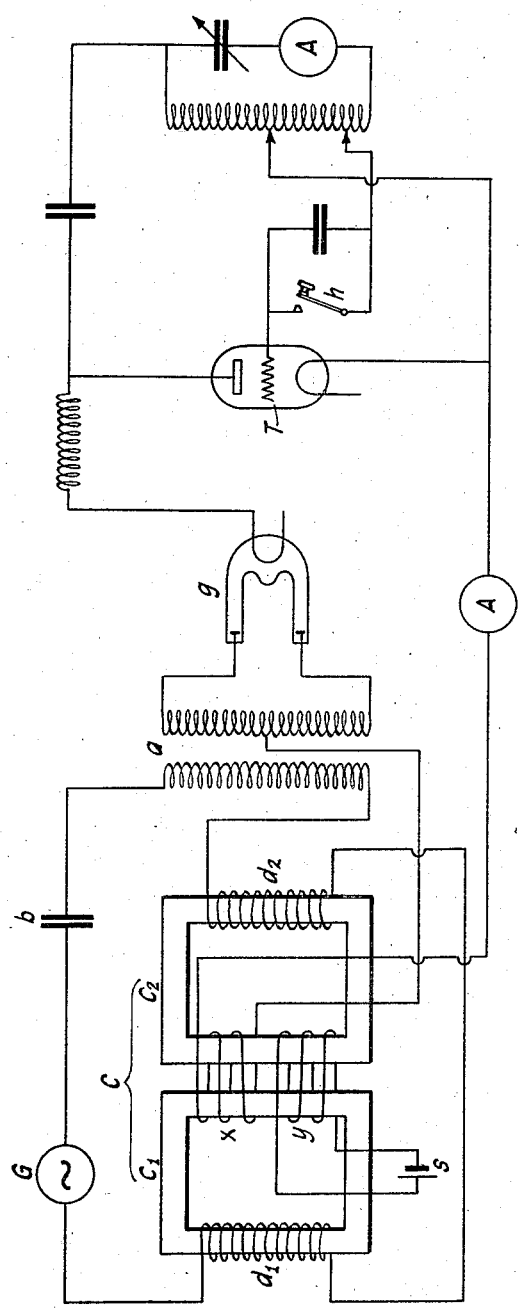
INVENTOR
WALTER SCHÄFFER
BY Tam J. Adams
ATTORNEY Patented Dec. 14, 1926.

1,610,615

UNITED STATES PATENT OFFICE.

WALTER SCHÄFFER, OF BERLIN, GERMANY, ASSIGNOR TO GESELLSCHAFT FÜR DRAHTLOSE TELEGRAPHIE M. B. H., OF BERLIN, GERMANY, A CORPORATION OF GERMANY.

ARRANGEMENT FOR MAINTAINING ANODE VOLTAGE CONSTANT IN TUBE TRANSMITTERS.

Application filed October 28, 1924, Serial No. 746,267, and in Germany November 17, 1923.

It is known that the voltage of alternating current generators, due to the reaction of the armature, in case of inductive load, is lower than that voltage generated by the same direct current excitation in case of no load; on the contrary, in the case of a capacitive load, the voltage is higher than the corresponding no load voltage.

The present invention utilizes this phenomenon for maintaining the anode voltage of vacuum tube transmitters constant in signalling.

An object of the invention is to provide such an arrangement which will cause the generator to have a leading power factor when a load is drawn therefrom by the function of the tube transmitter and to have less leading power factor or lagging power factor when no load is drawn therefrom.

Other objects will be apparent from the following description and appended claims when considered with the accompanying drawing in which the single figure is a circuit illustrating the invention. Referring to the drawing, transformer $a$, capacity $b$, and variable iron inductance coil $c$ are serially connected in the output circuit of alternator G. The iron inductance $c$ is constructed in the known way, in that the alternating current windings $d_1$ and $d_2$ are divided and are placed on two different iron cores $c_1$ and $c_2$, and the premagnetization windings, $x$ and $y$ surround both iron cores so that no alternating voltages are generated in them. Counter-premagnetization due to winding $y$ and battery $s$ compensates the premagnetization by the anode current passing thru winding $x$ when the sender T is at rest.

The sending tube T has its anode current supplied from alternator G thru double rectifier $g$. The input and output circuits of tube T are arranged to be connected to produce sustained oscillations by the operation of sending key $h$.

In case of no load a low primary current is present in the transformer $a$. The transformer has a comparatively high self-inductance and, likewise the iron inductance $c$, as it is not premagnetized due to the opposing effects of windings $x$ and $y$. By suitably dimensioning the capacity $b$, it is therefore possible to attain that in case of no load (telegraphy interval), the generator is inductively loaded.

In case of load (telegraphy dot or dash) a comparatively high primary current flows through the transformer $a$ and the iron inductance $c$ is premagnetized, due to an increase in anode current flowing thru winding $x$ caused by the operation of tube T. Consequently its inductance is diminished and the generator G is capacitively loaded.

Accordingly the generator is capacitively loaded whilst signalling and, on the contrary, is inductively loaded at no load. According to the present method by means of the capacitive loading setting in, in case of load, the resulting excitation and consequently the voltage of the generator (by suitably dimensioning the capacity $b$ and inductance $c$) is increased in such a way that the voltage in case of load is equal to that in case of no load.

Having disclosed my invention, I am entitled to all modifications thereof as fairly fall within the scope of the following claims.

1. In combination, means for transmitting radio waves having an element to be supplied with current at constant potential. means for supplying the current having an inherent drooping voltage characteristic on inductive load, inductive and capacitive loading means, means for varying one of said last means to offset the other sufficiently according to the current supplied to the transmitting means to keep the voltage applied to said element constant within the range of operation of the transmitting means.

2. In combination, means for transmitting radio waves having an element to be supplied with current at constant potential, means for supplying the current having an inherent drooping voltage characteristic on one type of reactive load, inductive and capacitive loading means, means for varying one of said last means to offset the other sufficiently according to the current supplied to the transmitting means to keep the voltage applied to said element constant within the range of operation of the transmitting means.

3. In combination, means for transmitting radio waves having an element to be supplied with current at constant potential, means for supplying the current having an inherent drooping voltage characteristic on one type of reactive load, inductive and capacitive loading means, means for varying one of said last means to offset the other sufficiently according to the current supplied to the transmitting means to keep the voltage applied to said element within the useful range of operation of the transmitting means.

4. In combination an oscillator, a modulator controlling the output of the oscillator, a rectifier for supplying the oscillator with current, a generator for supplying the rectifier and having capacitive and inductive loading devices, one of said devices being controlled by the rectifier current to keep the balance of inductive and capacitive load at the right proportion to produce constant generator output potential.

5. In combination an oscillator, a modulator controlling the output of the oscillator, a rectifier for supplying the oscillator with current, a generator for supplying the rectifier and having capacitive and inductive loading devices, the inductive device being controlled by the rectifier current to keep the balance of inductive and capacitive load at the right proportion to produce constant generator output potential.

6. In combination an oscillator, a modulator controlling the output of the oscillator, a rectifier for supplying the oscillator with current, a generator for supplying the rectifier and having capacitive and inductive loading devices, the inductive device having windings traversed by the rectifier current.

7. In combination an oscillator, a modulator controlling the output of the oscillator, a rectifier for supplying the oscillator with current, a generator for supplying the rectifier and having capacitive and inductive loading devices the inductive device having windings traversed by the rectifier current, and an auxiliary current, supplied to offset the effect of the rectifier current.

8. In combination an oscillator, a modulator controlling the output of the oscillator, a rectifier for supplying the oscillator with current, a generator for supplying the rectifier and having capacitive and inductive loading devices, the inductive device having windings traversed by the rectifier current, and an auxiliary current, supplied to offset the effect of the rectifier current, when the minimum current flows through the rectifier.

9. In combination an oscillator, a modulator controlling the output of the oscillator, a rectifier for supplying the oscillator with current, a generator for supplying the rectifier and having capacitive and inductive loading devices, the inductive device having windings traversed by the rectifier current, and an auxiliary current, supplied to offset the effect of the rectifier current, when the minimum current flows through the rectifier, whereby constant potential is maintained on the oscillator.

WALTER SCHÄFFER.